Nov. 2, 1926.
J. C. BOHMKER
1,605,210
SEED SOWER
Filed April 2, 1925      2 Sheets-Sheet 1
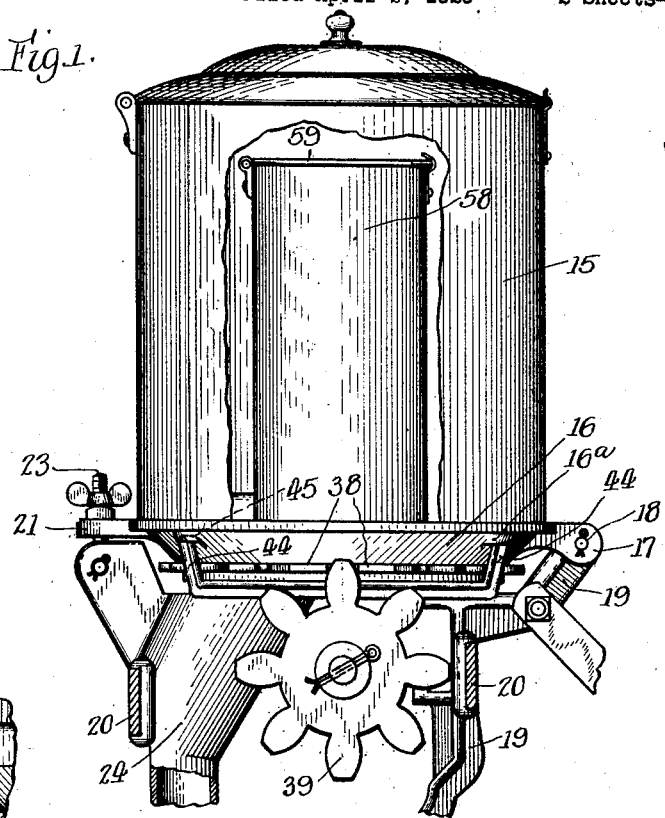
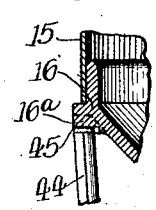
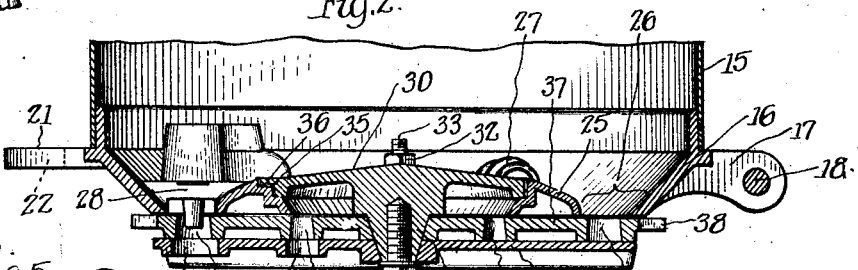
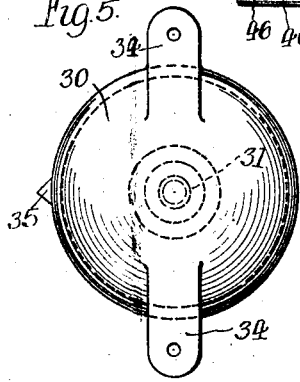
Inventor:
John C. Bohmker,
By Churchill Parker Carlson Attys.

Nov. 2, 1926.                                             1,605,210
                        J. C. BOHMKER
                         SEED SOWER
                     Filed April 2, 1925           2 Sheets-Sheet 2
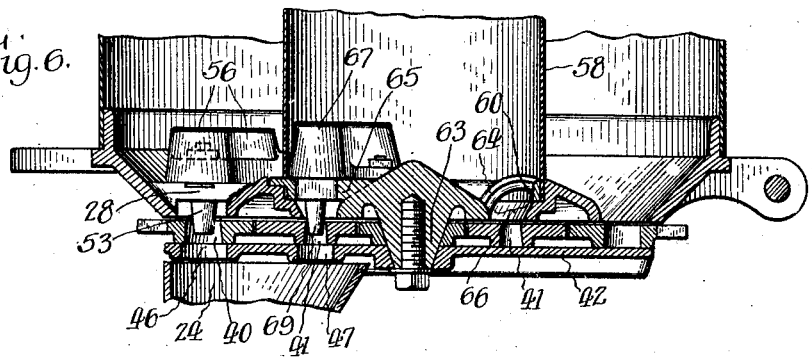
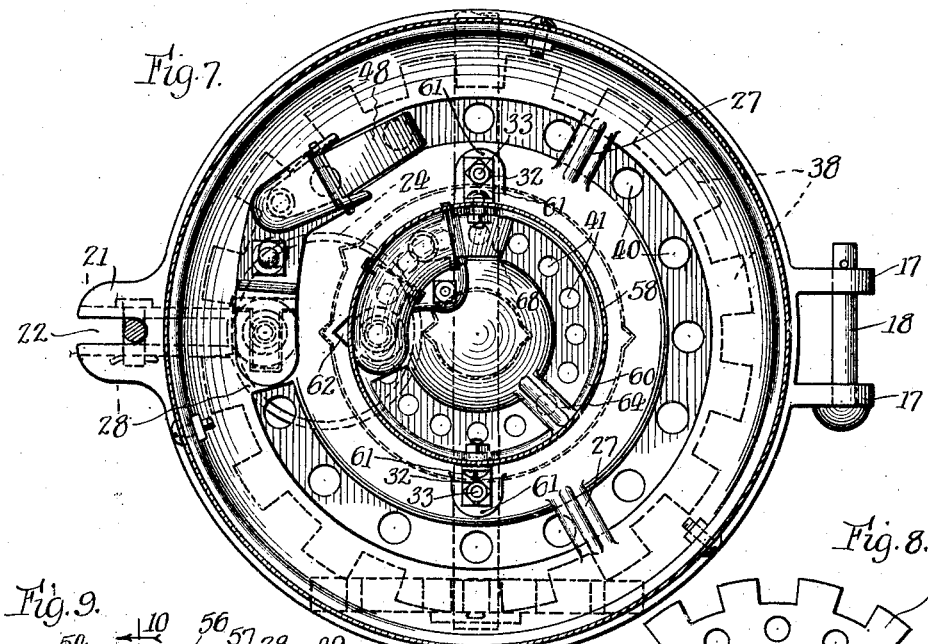
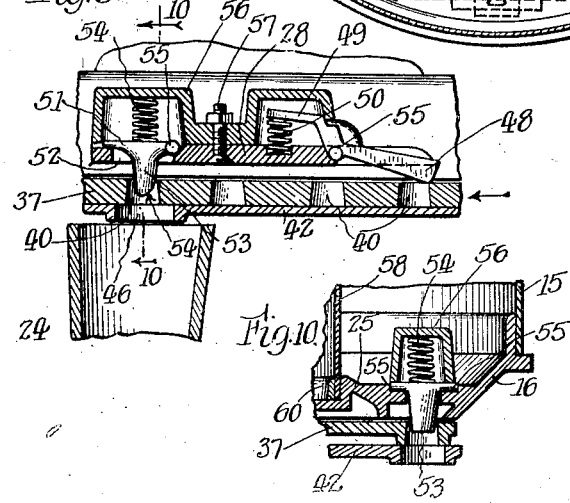
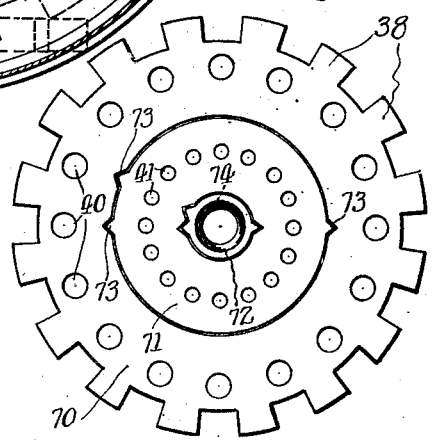
Inventor:
John C. Bohmker,
By Churchill Parker Carlson
Attys.

Patented Nov. 2, 1926.

1,605,210

UNITED STATES PATENT OFFICE.

JOHN C. BOHMKER, OF KANKAKEE, ILLINOIS, ASSIGNOR TO SEARS, ROEBUCK AND CO., OF CHICAGO, ILLINOIS, A CORPORATION OF NEW YORK.

SEED SOWER.

Application filed April 2, 1925. Serial No. 20,098.

This invention relates generally to seed sowers or planters and in particular to a new duplex planter and to seed feeding mechanism therefor.

Heretofore when a farmer has wished to sow corn and peas or beans simultaneously, it has been necessary to mount upon the seed planting machine separate hoppers and separate feeding mechanisms to be operated by the machine. Ordinarily but one kind of seed is planted using only one driving mechanism, but when it is desired to plant the two kinds of seed an extra feeding shaft or other suitable mechanism must be provided on the machine or must be added to it to effect the planting of two kinds of seeds simultaneously.

The primary object of the present invention is to provide a single seed planter comprising hopper and feeding mechanism which is of such a character that it may be adapted to feed a second kind of seed at the same time from the same operating mechanism of the machine.

Still another object is to provide two seed hoppers having parts of their feeding mechanisms in common.

Still another object of the invention is to provide a seed hopper sufficiently large to contain therein a second hopper which may be removably mounted therein.

Still another object is to provide a seed planter with a feed plate having two series of seed holes and to provide a construction permitting associating with the plate a seed hopper for one series when it is desired to make both series effective for delivering seed.

A particular object is to provide a seed plate comprising a plurality of sections and to so relate the sections to each other and to the frame of the planter that it is imposible to mount any of the sections in improper relation with respect to the hoppers.

Still other and ancillary objects and advantages of the invention will be apparent from the description of the device embodying the invention which is shown in the accompanying drawings, in which—

Figure 1 is a general view of the planter showing the nested hoppers.

Fig. 2 is a detail cross sectional view through the large hopper showing a cover plate which replaces the inner hopper.

Fig. 3 is a detail view of parts of the framework of the planter.

Figs. 4 and 5 are detail views of the cover plate shown mounted in Fig. 2.

Fig. 6 is a view similar to Fig. 2 showing the inner hopper mounted in the position of the cover plate appearing in Fig. 2.

Fig. 7 is a horizontal cross section through the duplex planter of Fig. 2, showing the feeding mechanism in elevation.

Fig. 8 is a detail view showing the construction of the sectional feed plate.

Fig. 9 is a substantially rectified circumferential section of the seed cut-off and ejector of the large hopper.

Fig. 10 is a cross section of the mechanism shown in Fig. 9 on the line 10—10 thereof.

The device shown in the drawings, however, is merely an exemplary embodiment of the invention for the purpose of explaining the nature and application of the invention and it is not to be construed as limiting the invention to the particular construction set forth. It is further to be understood that the invention contemplates such other embodiments, modifications, and alternative constructions as fall within the scope of the appended claims.

The device of the drawings is particularly adapted for sowing corn and beans at the same time. For the purpose of sowing the corn I provide a corn hopper which is in the present instance a cylindrical container 15 carried by an annular frame 16. The frame 16 is provided with lugs 17 through which a pin 18 hinges the device to a frame 19 which is suitably mounted on brackets 20 of a planting machine, not shown. A second lug 21 on the annular hopper frame 16 has a slot 22 therein for a locking bolt 23 pivotally fixed in the frame 19. Frame 19 also carries a chute 24 for delivering the seed.

The hopper frame 16 carries therewith an inner annular ring or frame 25 supported by a suitable bridge structure spanning an intervening space 26. In the present instance, the bridge structure comprises two inverted U-shaped bridge structures 27 (Figs. 2 and 7) and a flat connecting web 28 of considerable arcuate extent (Figs. 2, 6, 7 and 9).

Means is provided at the bottom of the hopper for feeding seed therefrom into the chute 24. The two spaced annular frames or rings 16 and 25 which in the present instance are concentric are preferably made substantially flush with each other. A plate is mounted against the flush bottoms and is adapted for use as a feeding plate. The plate is made rotatable with respect to the fixed annular rings 16 and 25 by the provision of suitable mounting means therefor. A suitable bearing stud is provided which is made rigid with the inner ring frame 25 by any suitable structure. Referring particularly to Figs. 2, 4 and 5, there is shown a circular plate 30 which has a conical stud or projection 31 on the under side thereof. The plate 30 is adapted to be secured to the inner ring 25 by nuts 32 and bolts 33 passing through the ring 25 and through suitable radial lugs 34 provided on the plate. If desired a radial V-shaped lug 35 may be made on the rim of the disk plate 30 to fit into a correspondingly shaped notch 36 in the ring 25. The bearing spindle 31 is preferably arranged to project below the flush bottoms of the two rings. In the present instance the feeding plate is in the form of a large gear 37 bearing on the stud 31. The feed plate is provided with radial lugs 38 which act as gear teeth for a driving gear 39 turned by the ground wheel of the machine or other suitable mechanism (not shown) upon which the planter is mounted. The gear teeth 38 preferably project beyond the periphery of the outer ring 16. Two series of holes are provided in the feed plate, one series 40 being under the space 26 between the two rings and the other series 41 being within the inner ring 25. A second plate 42 also bearing on the cone stud 31 lies below the feed plate and is secured rigidly to the cone stud by a screw bolt 43 entered into the end of the stud 31, the head of the bolt retaining the plate. Suitable means is provided to prevent the under plate 42 from clamping the gear or feed plate 37 tightly to the rings. In the present instance, spacing members are formed between the lower plate 42 and one of the rings. These consist of right angular radial extensions 44 projecting outwardly and then upwardly from the lower plate 42 to clear the protruding teeth 38 of the feed plate 37. These extensions 44 rest against parts of the outer ring 16 which are provided therefor. The ring 16 is preferably formed with flat surfaced cast lugs 16ª thereon spaced to engage the ends of the right angular projections 44. In order to prevent the lower plate from slipping or turning with respect to the frame whereby the projections 44 and the lugs 16ª would become out of register, I provide a V-shaped end on one of the extensions 44 and a V-shaped groove therefor in one of the lugs 16ª. These are shown in Figs. 1 and 3.

The lower plate 42 is provided to close the holes 40 and 41 of the feed plate.

In the present instance, the closing plate 42 is solid except for two holes 46 and 47 located therein to register with the holes 40 and 41 respectively of the feed plate 37. Rotation of the feed plate brings the seed resting in the holes 40 around to the fixed holes 46 thus permitting the delivery from the holes 40 and 46 into the chute 24. The delivery of seed, however, is preferably not directly from the hopper through the registered holes, but is made indirectly and is positively controlled. In order to assure delivery of the seed I provide mechanism to act as a seed cut-off and as a seed ejector. In the present instance the hole 46 is located under one end of the flat bridge member 28. Referring to Fig. 9 I show the feed plate 37 as moving to the left, this being indicated by an arrow which corresponds to counterclockwise direction in Fig. 7. Pivoted into the bridge member 28 is a seed dog or cut-off 48 lying in the space 26 over some of the holes of series 40. A rearward extension 49 of the dog rises above and behind the pivot of the dog and a spring 50 forces the dog into engagement with the feed plate. This prevents seed from being carried on the feed plate in under the bridge 28, only those seeds which lie in the holes 40 being able to pass. Thus each hole measures the seed by volume. The passage of the seeds under the spring actuated cut-off 48 is likely to force or jam seeds in the hole 40 so that they will not readily pass out on registering with the hole 46. Consequently, a suitable ejector is provided. In the present instance this includes a dog 51 pivoted into the bridge member 28 and adapted to rest upon the bridge. A hole 52 is provided in the bridge underneath the dog through which a finger 53 carried by the dog extends into a hole 40. The forward side of the finger is beveled as at 53 so that the turning of the plate will raise the finger from the hole against a suitable spring 54. Each of the dogs 48 and 51 have a similar pivoted relation with respect to the bridge member. This comprises trunnions 55 on the dogs lying in depressions on top of the bridge 28. A housing 56 is mounted on the bridge 28 by a bolt 57, which housing serves to enclose the end of the dog 48 and the whole of dog 51, spring 54 on the ejector dog being disposed between the dog 51 and the top of the housing 56. The sides or edges of the housing adjacent the bridge member 28 serve to hold the trunnions 55 in their bearing depressions formed in the bridge member. Ejector finger 53 serves also as a lock or catch device to hold the feed plate against turning except when a driving force is applied to the feed plate to raise the finger 53 from one of the holes 40.

The arrangement so far described relates to the parts useful as a corn planter. I provide the above construction of such a character that the inner ring 25 may serve as a mounting for a second hopper 58. Hopper 58 preferably has a suitable cover 59. In the present instance the hopper 58 is contained wholly within the first hopper 15, this being a logical place therefor by reason of the structure heretofore described. However, it is apparent that the construction is not limited to this arrangement. In Fig. 6 there is shown a suitable construction of a hopper which will replace the cover plate 30 shown in Fig. 2, the construction of hopper 58 being of such a character that it serves as a substitute for the plate 30 in supporting the removable plates 37 and 42 on the under side of the planter. In the present instance the hopper 58 is a cylindrical receptable carrying rigid therewith a ring 60. The ring and hopper are rigidly secured together by suitable means and are provided with radial lugs 61 to substitute for the lugs 34 of the plate 30, whereby the hopper is secured to the ring 25 by the bolts 33. A lug 62 is also provided on the hopper 58 to fit into the notch 36 of the ring 25 as above mentioned with relation to lug 35 of the plate 30. This lug 62 assures that the receptacle is mountable in but one position, this position being chosen so that the feeding mechanism of the second hopper shall register properly with the hole 47 provided in the plate 42. A conical bearing stud 63 similar to the stud 31 on plate 30 is rigidly associated with the hopper ring 60 by suitable bridge members 64 and 65 corresponding generally to the arched bridge member 27 and the flat extensive bridge member 28, respectively, of the first hopper. This forms an annular space 66 under the bridge members which is arranged to lie over the holes 41 of the feed plate 37 above described. On the bridge 65 is a housing 67 containing cut-off and ejector mechanism similar in construction to that contained within the housing 56 of the first hopper. The two ejector mechanisms are so arranged in relation to the holes 46 and 47 of the under plate 42 that the ejector mechanisms operate simultaneously thus to eject the two kinds of seed at the same time, rather than in a timed relation. Of course, any other relation can be provided when desired but simultaneous ejection is preferred. Without further describing the detail construction of the seed cut-off and ejector mechanism it will be pointed out that this mechanism includes a seed dog or cut-off 68 (Fig. 7) and an ejector finger 69 (Fig. 6) which correspond in function to the dog 48 and finger 53 of the first hopper seed-feeding structure.

In order to allow for various uses of the combination planter, I do not limit the construction to the integral feed plate 37 shown in Fig. 2, and having two series of holes 40 and 41 therein. In order to permit one to change either series to a series having fewer holes or different sized holes, I provide a built-up plate as shown particularly in Fig. 8. The built-up plate comprises in the present instance three sections 70, 71 and 72. Section 70 is an annular ring having gear teeth 38 for the driving gear 39 and having the seed holes 40 therein for the seed of the largest hopper. It will be understood that these holes may be of any size and number and are herein designated by the numeral 40 by reason of their being first mentioned as formed in the integral feed plate 37 and referred to through this description as provided for the seed of the large hopper. Section 71 is likewise an annular plate containing the holes 41 as found in the integral plate 37. Since it is desirable that the holes 40 and 41 flare outwardly from the hoppers as shown, it is important that the plates never be inserted in the planter in their inverted position. Consequently, irregularly spaced interfitting lugs and notches 73 are disposed between the sections of the built-up plate. In the present instance three lugs are shown which are unsymmetrically disposed about the axis of the plate, there being two lugs closely adjacent to each other and a third one substantially opposite the two, thus to facilitate assembling the plate by visualizing the relation of the lugs and the notches. Section 72 is a bearing section or rotary member having a conical bearing surface 74 to fit the conical stud 63 carried by the inner hopper or in the absence of the inner hopper to fit the conical stud 31 of the plate 30.

To use the planter for one kind of seed one may use either of the hoppers as desired and provide therefor a suitable feed plate. If desired, the seed capacity of the planter may be increased by removing the inner hopper 58 and inserting the cover plate 30. Also for a single kind of seed the feeding capacity of the planter may be doubled by using the two hoppers and sowing the same kind of seed from each.

When one desires to use two kinds of seed both hoppers are filled and a unitary feed plate or built-up feed plate having the required size of holes therein is secured in the device. The operation of changing plates is the most common operation in preparing to use a device of this sort. As it is important that the feed plates be inserted with the feeding holes flaring away from the hopper, provision of a construction as exemplified by the various plate lugs 73, and the single hopper lug 62, together with the conical bearing relation, makes it impossible to assemble the device with any of the parts in the wrong position.

In the preferred embodiment of the invention I have provided a variety of replaceable and renewable parts which in themselves have elements of novelty contributing to the practical character of the invention as will appear in the appended claims. From the foregoing description of the preferred embodiment of the invention, it will be apparent that various modifications and changes in construction and arrangement of the parts are possible and it is to be understood that all such other forms of the invention are herein contemplated, as will appear by the scope of the appended claims.

I claim as my invention:

1. In a seed planter having a demountable feeding ring with seed holes therein, a rotary member upon which said ring is mountable, and lugs unsymmetrically placed on said member with respect to the axis of the ring, said lugs being arranged to engage in said ring to prevent mounting said ring on said member in inverted relation.

2. In a seed planter having two seed hoppers, a feed plate therefor having a conical bearing surface, a conical bearing stud secured to said hoppers for said feed plate, said feed plate comprising two concentric rings in fixed axial relation mounted upon said bearing stud, one of said rings having lugs unsymmetrically disposed about the axes of the rings to engage with the other ring for assembling the feed plate in proper relation, said conical stud compelling proper assembly of the feed face plate on said hoppers.

3. A feed plate for a seed planter having an annular series of holes and an opening for mounting said plate upon a rotary member, said opening having its periphery deformed unsymmetrically with respect to the axis of the annular series of holes for assembling with said rotary member to mount said plate in but one relation with respect thereto.

4. A bearing member for a feed plate in a seed planter comprising, in combination, a substantially annular member having a conical bore therein for a conical bearing stud, said member having an external periphery unsymmetrical with respect to the axis of the bore for engaging the feed plate in but one relation with respect to said bearing.

5. A seed planter having, in combination, a hopper, a rotary feed plate therefor having two sets of seed holes therein, means for mounting in the hopper a second hopper for one of said series of seed holes, a closure adapted to be mounted on said means in place of said second hopper to keep the seeds of the first hopper from the seed holes provided for the second hopper, said closure having a bearing stud associated therewith for the feed plate.

6. A seed sower having, in combination, a hopper body including an annular ring base having a planar under side, an inner ring spaced therefrom having an under side flush with that of said first ring, a rigid connection between said rings bridging the annular space therebetween, a member adapted to be positioned on the inner ring, a bearing stud on said member projecting below the planes of the under sides of said rings, a flat seed plate having seed holes therein adapted to bear on said stud and to be positioned below said rings to close the annular space, said seed plate turning freely on said stud, a seed-hole-closing plate below the seed plate, means to clamp together the seed-hole-closing plate and the stud whereby to include the dual ring structure in clamped relation between the lower plate and the member positioned on the inner ring, said seed plate being unclamped and free between the closing plate and the ring structure.

7. A seed sower having, in combination, a hopper body including an annular ring base having a planar under side, an inner ring spaced therefrom having an under side flush with that of said first ring, a rigid connection between said rings bridging the annular space therebetween, a member adapted to be positioned on the inner ring, a bearing stud on said member extending downwardly below the flush under sides of the rings, a seed-hole-closing plate adapted to engage said stud to lie in spaced relation to said rings, means to prevent rotation of said plate on the stud, means to hold the plate against dropping away from said stud, and a seed plate positioned rotatably on said stud between the seed-hole-closing plate and the ring structure.

8. In combination, two seed hoppers, each hopper having a base ring and a seed cut-off mechanism rigid therewith, the larger hopper having an inner ring rigid with its base ring, the base ring of the smaller hopper being adapted to be set into and onto the inner ring of the larger hopper, the smaller hopper having a bearing stud rigid with the base ring, said stud passing below the base rings of the two hoppers in the described positions of the base rings, a seed plate for both hoppers bearing on said stud, and a seed-hole-closing plate on said stud, said plate having lugs extending upwardly and adapted to be held against the base ring of the larger hopper, and clamping means to clamp said last mentioned plate to said stud to hold the parts assembled in operative relation, said seed plate being rotatably positioned in unclamped relation between said closing plate and the base rings.

9. A seed sower having, in combination, a hopper, a base structure for the hopper including an outer ring, an inner ring, and a connection means between said two rings bridging the annular space between the rings, said hopper being mounted on the outer ring, a member mounted on said inner ring, a plate below said base structure in abutting relation thereto, means to clamp said plate to said member whereby the base structure is clamped between said member and said plate in rigid relation, said plate and base being so formed as to leave a space therebetween at the bottom of the hopper, and a rotatable seed plate mounted in said space, said bottom plate and said seed plate being perforated with registering holes as an outlet for seed in the hopper.

10. A seed sower having, in combination, a hopper, a base structure for the hopper including an outer ring, an inner ring, and connecting means between said two rings bridging the annular space between the rings, said hopper being mounted on the outer ring, a second hopper mounted on the inner ring within the first hopper, a member carried by the second hopper forming a bottom therefor, there being an annular space between said member and the side wall of the second hopper, a plate below said base structure in abutting relation thereto, means to clamp said plate to the member carried by the second hopper whereby the base structure is clamped between the second hopper and said plate in rigid relation, said plate and base structure being so formed as to leave a space therebetween at the bottom of both hoppers, and a rotatable seed plate mounted in said space, said seed plate having holes therein for each hopper, and said bottom plate having holes therein adapted to register with the holes for each hopper to form seed outlets.

In testimony whereof, I have hereunto affixed my signature.

JOHN C. BOHMKER.

Certificate of Correction.

It is hereby certified that in Letters Patent No. 1,605,210, granted November 2, 1926, upon the application of John C. Bohmker, of Kankakee, Illinois, for an improvement in "Seed Sowers," errors appear in the printed specification requiring correction as follows: Page 2, line 79 for the word "hole" read *holes;* page 4, line 39, claim 2, before the word "relation" insert the word *face*, and line 40, strike out the word "face"; and that the said Letters Patent should be read with these corrections therein that the same may conform to the record of the case in the Patent Office.

Signed and sealed this 14th day of December, A. D. 1926.

[SEAL.]
M. J. MOORE,
*Acting Commissioner of Patents.*